United States Patent
Dall et al.

(10) Patent No.: US 9,398,026 B1
(45) Date of Patent: *Jul. 19, 2016

(54) METHOD FOR AUTHENTICATED COMMUNICATIONS INCORPORATING INTERMEDIARY APPLIANCES

(71) Applicant: Teradici Corporation, Burnaby (CA)

(72) Inventors: William John Dall, New Westminster (CA); Arthur Neil Klassen, Coquitlam (CA)

(73) Assignee: Teradici Corporation, Burnaby, British Columbia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,931

(22) Filed: May 13, 2015

Related U.S. Application Data

(63) Continuation of application No. 13/755,370, filed on Jan. 31, 2013, now Pat. No. 9,077,709.

(60) Provisional application No. 61/592,675, filed on Jan. 31, 2012.

(51) Int. Cl.
*H04L 29/06* (2006.01)

(52) U.S. Cl.
CPC .............. *H04L 63/126* (2013.01); *H04L 67/42* (2013.01)

(58) Field of Classification Search
CPC ... H04L 63/126; H04L 63/0823; H04L 63/18; H04L 67/42; H04L 29/06
See application file for complete search history.

(56) References Cited

U.S. PATENT DOCUMENTS

| | | |
|---|---|---|
| 5,703,949 A | 12/1997 | Rosen |
| 6,971,017 B2 | 11/2005 | Stringer et al. |
| 7,421,442 B2 | 9/2008 | Gelb et al. |
| 7,430,755 B1 | 9/2008 | Hughes et al. |
| 7,486,651 B2 | 2/2009 | Hagiwara et al. |
| 7,584,505 B2 | 9/2009 | Mondri et al. |
| 7,613,822 B2 | 11/2009 | Joy et al. |
| 7,624,264 B2 | 11/2009 | Aura et al. |
| 2003/0061170 A1 | 3/2003 | Uzo et al. |
| 2006/0041938 A1 | 2/2006 | Ali |
| 2007/0154016 A1* | 7/2007 | Nakhjiri .................. H04L 63/06 380/270 |
| 2008/0141313 A1 | 6/2008 | Kato et al. |
| 2009/0083537 A1 | 3/2009 | Larsen et al. |
| 2009/0119504 A1 | 5/2009 | Van et al. |
| 2009/0220080 A1 | 9/2009 | Herne et al. |
| 2010/0241694 A1 | 9/2010 | Jensen et al. |
| 2010/0250951 A1 | 9/2010 | Ueno et al. |
| 2011/0113244 A1* | 5/2011 | Chou .................... H04L 63/166 713/168 |

* cited by examiner

*Primary Examiner* — Chau Le
*Assistant Examiner* — Muhammad Chaudhry
(74) *Attorney, Agent, or Firm* — Moser Taboada

(57) ABSTRACT

Method for managing appliance authentication. In one embodiment, the method comprises generating, by a server, a first secret and a second secret from a certificate; transmitting from the server to a client computer, via a first channel secured and trusted based on a trusted computer, the first secret and the second secret; presenting the certificate to an appliance in response to a secure channel request from the appliance, wherein the appliance is holding the first secret; receiving, from the appliance, a description of a second channel, via the appliance, between the client computer and the server; establishing a trust in the second channel based on the description; and transmitting, in response to the trust in the second channel, via the second channel, channel information that comprises a portion of the description signed by the second secret.

20 Claims, 13 Drawing Sheets

1300

US 9,398,026 B1

METHOD FOR AUTHENTICATED COMMUNICATIONS INCORPORATING INTERMEDIARY APPLIANCES

CROSS-REFERENCE TO RELATED APPLICATIONS

This application is a continuation of the commonly assigned U.S. patent application Ser. No. 13/755,370 filed on Jan. 31, 2013, which claims benefit of U.S. Provisional Patent Application 61/592,675 entitled "Intermediary Appliance Authentication Method", filed on Jan. 31, 2012, both of which are herein incorporated in their entirety by reference.

BACKGROUND OF THE INVENTION

1. Field of the Invention

Embodiments of the present invention relate generally to techniques for managing authentication of intermediary apparatus located in the network path between a client device and a server.

2. Description of the Related Art

It is relatively common for a network to comprise one or more intermediary appliances, such as Wide Area Network (WAN) accelerators or virus detection devices, inserted in the path between a client device (e.g., a personal computer) and a server (e.g., an application server or server enabled to provide remote desktop services). To maintain secure coupling between the client and the server, the intermediary appliance is generally pre-configured to be included in the trust domain of the server or has the certificate authority to establish trust with a client such that it may intercept and modify secure communications between the client and the server. In such topologies, clients are generally also burdened with maintaining signed certificates and related certificate management infrastructure in order for them to connect to intermediary appliances and initiate a secure session.

However, selective insertion of authorized intermediary appliances in a secure manner remains challenging and therefore there is a need in the art for a method of authenticating such authorized intermediary appliances while also rejecting authentication of, or participation by, unauthorized appliances capable of orchestrating man-in-the-middle (MITM) attacks or other malicious behavior.

SUMMARY OF THE INVENTION

Embodiments of the present invention generally relate to a method for managing appliance authentication. In one embodiment, the method comprises generating, by a server, a first secret and a second secret from a certificate; transmitting from the server to a client computer, via a first channel secured and trusted based on a trusted computer, the first secret and the second secret; presenting the certificate to an appliance in response to a secure channel request from the appliance, wherein the appliance is holding the first secret; receiving, from the appliance, a description of a second channel, via the appliance, between the client computer and the server; establishing a trust in the second channel based on the description; and transmitting, in response to the trust in the second channel, via the second channel, channel information that comprises a portion of the description signed by the second secret.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
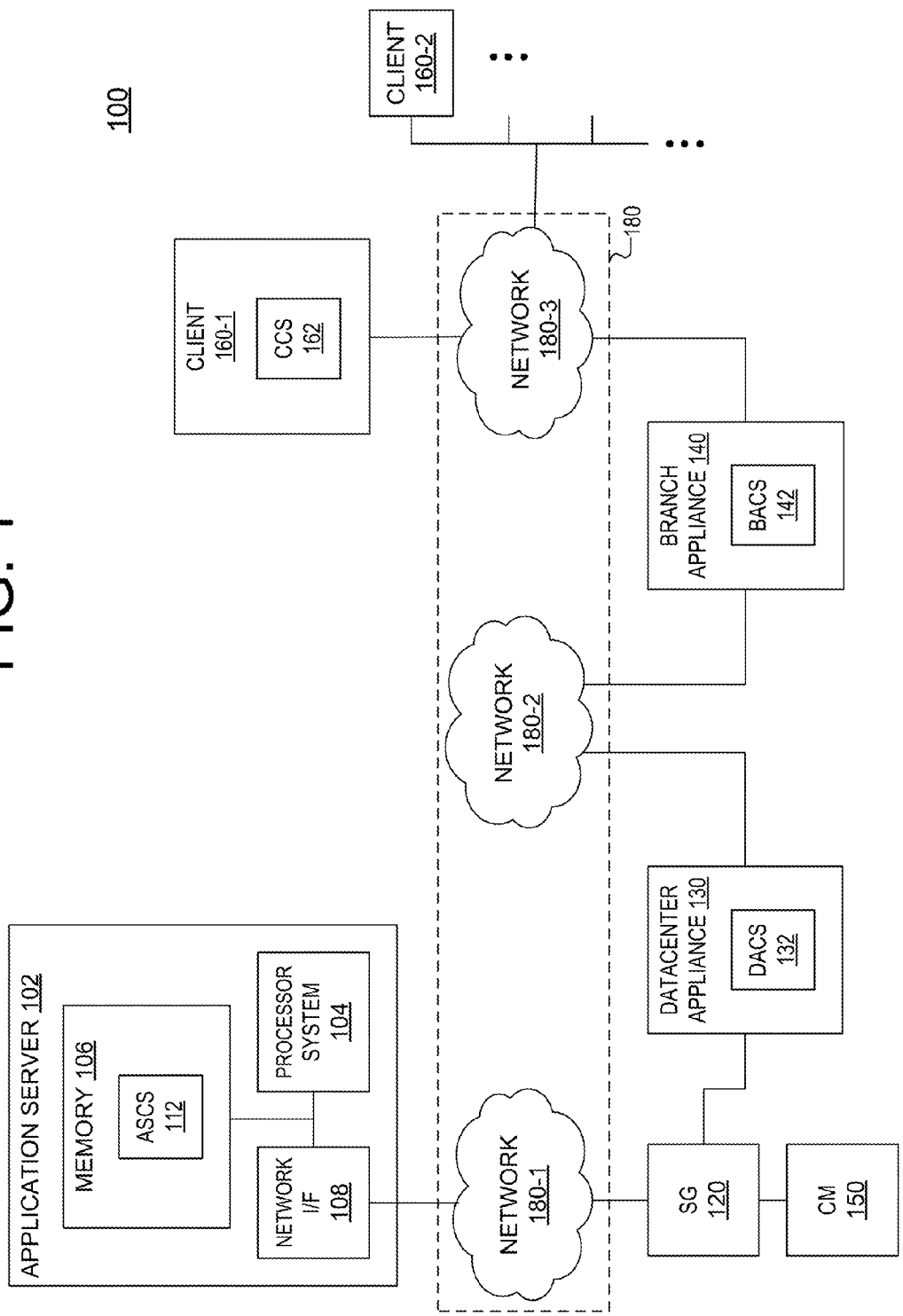
FIG. 1 is an illustration of a networked client-server system in which intermediary appliances are participants in the communications between the client and server in accordance with one or more embodiments of the present invention.

The invention may be implemented in numerous ways, including as a process, an article of manufacture, an apparatus, a system, and as a set of computer-readable descriptions and/or instructions embedded on and/or in a non-transitory computer-readable medium such as a computer-readable storage medium. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The Detailed Description includes an Introduction ("Overview") to facilitate the more rapid understanding of the remainder of the Detailed Description. Additionally, the invention encompasses all possible modifications and variations within the scope of the issued claims.

The term processor as used herein refers to any type of processor, CPU, microprocessor, microcontroller, embedded processor, media processor, graphics processor, or any other programmable device capable of executing and/or interpreting instructions in a form of software (such as microcode, firmware and/or programs).

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

An authorized appliance or computer, as described herein, comprises an appliance or computer in possession of a self-signed certificate traceable to a trusted computer (in which the self-signed certificate may not be traceable to a Certificate Authority (CA)) or a verifiable certificate such as a secure socket layer (SSL) certificate signed by a Certificate Authority (CA).

The term "secure" as used herein generally refers to a channel created between two devices that utilize a common secret to ensure the channel cannot be understood or modified by a third party. However, the presence of a secure channel does not pre-suppose that a trust relationship exists between the two devices. For example, one device may establish a secure channel with a misrepresented second device in which case the secure channel is not trusted.

The term "trust" as used herein generally refers to communications between two devices in which the second device has presented a certificate by the first device that is traceable to a certificate authority (CA) recognized by the second device. Since certificates are verified using a secure channel, trusted communications are generally also secure.

An 'application session' as defined herein comprises trusted exchange of data (e.g., media data such as compressed display information associated with a hosted application or hosted desktop, file data or other multimedia exchanges such as video) between a client endpoint (comprising a client device or client application software) and server application software, optionally including manipulation of the data (e.g., data compression) by one or more authorized intermediary appliances.

OVERVIEW

A client initiates an authentication process that enables the client to selectively allow one or more authorized intermediary appliances located in a network path between the client and an application server to participate in a subsequent secure application session established between the client and the application server while ensuring that non-authorized appliances or other devices are barred from compromising the security of the application session. In an exemplary embodiment, a Virtualized Desktop Infrastructure (VDI) client establishes a secure remote computing session (i.e., 'application session' or 'application protocol' session) with a virtualized desktop (i.e., the application server hosts a set of virtualized desktop computers, each enabled to establish an application session with a VDI client using a suitable remote desktop protocol) and the authorized intermediary appliances comprise paired WAN acceleration devices enabled to compress network data associated with the application session.

DETAILED DESCRIPTION

FIG. 1 illustrates selected details of an embodiment of a networked client-server system 100 ("system 100") comprising a client 160 communicatively coupled to an application server (AS) 102 via a network 180 and intermediary appliances, including a security gateway (SG) 120, datacenter appliance (DA) 130 and a branch appliance (BA) 140. For clarity, AS 102 is termed an 'application' server to distinguish its role from other server roles defined by the present specification. In practice, AS 102 may operate as a server, a peer or a client outside of its endpoint role in the authentication method described herein.

The AS 102 generally comprises a server hardware platform known to the art, such as a server blade from a manufacturer such as HP, Cisco or IBM, or a workstation computer and peripheral equipment, enabled to execute well known operating system software (e.g., one or more instances of Microsoft Windows operating system software), optionally in conjunction with hypervisor software known to the art (e.g., ESX, XenServer or VERDE Hypervisor products from VMware, Citrix and Virtual Bridges Corporations respectively), typically located in memory 106. The AS 102 may also comprise application software services (such as Microsoft Terminal Services (TS)) or software (such as "View Agent" from VMware) enabled to provide remote access to individual desktops and/or applications, such as word processing software, spreadsheets, financial data presentation, video or photo display or editing software, graphics software such as Computer Aided Design (CAD) software, Desktop Publishing (DTP) software, digital signage software, or the like, via TS or Virtualized Desktop Infrastructure (VDI).

The AS 102 comprises application server connection service (ASCS) 112 for facilitating the secure connection of one or more client computers 160 (shown as a client 160-1 and a client 160-2) to AS 102. In an exemplary VDI embodiment in which system 100 provides remote desktop services, a plurality of virtual machine are configured in memory 106, each virtual machine comprising an operating system and applications enabled to render display images into virtualized frame buffers, an ASCS 112 and a set of encoding services for enabling remote access to graphics (e.g., desktop images) by encoding the virtualized frame buffers, peripheral device functions (e.g., Universal Serial Bus (USB)) and audio functions that support the coupling of peripheral device data between applications in ASCS 112 and devices located at a remote client. As such, memory 106 may comprise a plurality of unique independently addressable instances of ASCS 112, each associated with a separate operating system and domain name (i.e., in an embodiment, different instances of ASCS 112 may be contacted using different Fully Qualified Domain Names (FQDN)).

The processor system 104 typically comprises one or more central processing units (CPUs), optionally one or more graphical processing units (GPUs) or a combination of CPU and GPU processing elements. Examples of a well-known suitable CPU include workstation or server class processors such as 32-bit, 64-bit, or other CPUs including XEON or OPTERON class microprocessors manufactured by INTEL and AMD Corporations respectively. However, any other microprocessor platform designed to perform the data processing methods described herein may be utilized. In an embodiment, the processor system 104 and network interface 108 are coupled to memory 106 by one or more bus structures, such as memory and/or Input/Output (I/O) busses known to the art with the aid of support circuits, including at least one of north bridge, south bridge, chipset, power supplies, clock circuits, data registers and I/O interfaces. The support circuits include at least one of address, control, interrupt and/or data connections, controllers, data buffers, drivers, repeaters, and receivers to enable appropriate communications between the processor system 104, memory 106, and network interface 108. In some embodiments, the support circuits further incorporate hardware-based virtualization management features, such as emulated register sets, address translation tables, interrupt tables, Peripheral Component Interconnect (PCI) I/O virtualization (10V) features, and/or I/O memory management unit (IOMMU).

The memory 106 comprises any one or combination of volatile computer readable media (e.g., random access memory (RAM), such as dynamic random access memory (DRAM), static random access memory (SRAM), extreme data rate (XDR) RAM, Double Data Rate (DDR) RAM and the like) and nonvolatile computer readable media (e.g., read only memory (ROM), hard drive, tape, CDROM, DVDROM, magneto-optical disks, Erasable Programmable Read-Only Memory (EPROM), Electrically Erasable Programmable Read-Only Memory (EEPROM), Flash EPROM and the like). Moreover, memory 106 may incorporate electronic, magnetic, optical, and/or other types of storage media. Network interface 108 generally provides compatibility with the network 180 and delivers services including Internet Protocol (IP) and Transmission Control Protocol (TCP) and/or unreliable datagram services such as User Datagram Protocol (UDP) services.

Client 160 is generally any form of computing device enabled by a processor and support circuitry to execute the functions of client connection service (CCS) 162 and connect to network 180. For example, in an embodiment, client 160 is a remote terminal in a networked computer system. Such remote terminals include zero- or thin-clients, personal or tablet computers, workstations, personal digital assistants (PDAs), wireless devices, and the like. In some embodiments, client 160 incorporates an image decoder that decodes image information for presentation on one or more local display devices, in the form of a remote Graphical User Interface (GUI). In other embodiments, client 160 also comprises one or more peripheral devices such as mouse, keyboard, and/or other well-known peripherals. CCS 162 generally comprises a set of machine executable software or firmware instructions (stored in memory of client 160) and software data structures enabled to facilitate a secure connection between client 160 and AS 102, including authorized intermediary appliances such as datacenter appliance (DA) 130 and branch appliance (BA) 140.

The connection manager (CM) 150 is a trusted computer with a certificate store comprising a verifiable certificate such as a self-signed certificate or a certificate traceable to a CA. CM 150 provides well-known connection management services for authenticating identified users of client 160 in advance of allowing connections between client 160 and AS 102, generally facilitated by directory resources such as Microsoft Active Directory, RSA Authentication Manager or the like. CM 150 generally comprises server hardware resources (e.g., part of a blade server), operating system and connection management software such as 'View Connection Server', 'Desktop Studio' or 'RD Connection Broker' software from VMware, Citrix and Microsoft or similar products from companies such as Leostream Corporation. In an embodiment, CM 150 is coupled to a trusted sub-net of network 180 (i.e., to network 180-1) and a security gateway (SG) 120 provides a proxy service that enforces restricted secure access to CM 150 (e.g., via Secure Socket Layer (SSL) or Hypertext Transfer Protocol Secure (HTTPS) protocols).

The network 180 comprises a communication system (e.g., the Internet, LAN, Wide Area Network (WAN), and the like) that utilizes common 4-tuple network addressing (i.e., combination of IP addresses and port numbers) that connects computer systems completely by wire, cable, fiber optic, and/or wireless links facilitated by various types of well-known network elements, such as Domain Name System (DNS) servers, Certificate Authorities (CA), CM 150, Network Address Translation (NAT) gateways, hubs, switches, routers, firewalls, and the like. The network 180 may employ various well-known protocols, such as security protocols, to communicate information amongst the network resources. In an embodiment, the network 180 comprises a first trusted datacenter portion (shown as network 180-1 coupled to AS 102 and SG 120) which is typically a private network isolated by a firewall, a second (often insecure) Wide Area Network portion (shown as network 180-2 coupled to DA 130 and BA 140) which may comprise part of the Internet and/or leased network links, and a third branch office portion (shown as network 180-3 coupled to BA 140 and clients 160 and 170) which is typically a private network isolated from network portion 180-2 by a firewall. In such a branch office configuration, a plurality of clients (including client, 160, 170 and others) are coupled to network 180-3, each comprising a service equivalent to CCS 162 to facilitate connection to AS 102 or another application server, the application servers typically coupled to network 180-1.

SG 120 is an optional server function, typically deployed in a perimeter region or Demilitarized Zone (DMZ) of network 180. SG 120 ensures that network traffic flowing from client 160 to AS 102 meets authorization and authentication rules, including those configured by an administrator. In an embodiment, SG 120 operates as a proxy host for CM 150 in addition to providing proxy services for application data directed to AS 102 from outside the datacenter network. The SG 120 typically includes a configuration and control interface (e.g., a TCP socket) to allow an external connection manager such as CM 150 to enable and disable application sessions between clients and AS 102. In some embodiments, SG 120 provides additional functions such as substituting the gateway domain name with specific domain names inside the trusted network and vice versa.

DA 130 and BA 140 are processing systems generally enabled to optimize network communications across network portion 180-2, for example providing WAN acceleration functions (e.g., data compression and/or data caching) although in various embodiments, additional or alternative traffic manipulation services (such as traffic shaping functions, quality-of-service (QoS) functions, additional encryption functions, transport reliability functions, traffic policy functions, performance monitoring functions and the like) may be provided. In an embodiment, DA 130 and BA 140 each comprise a hardware processor sub-system (e.g., a CPU such as a XEON, x86, ARM or MIPS class processor) and memory resources enabled to execute machine readable software, including DA connection service (DACS) 132 in the case of DA 130 and BA connection service (BACS) 142 in the case of BA 140. DA 130 and BA 140 may each comprise additional processing circuitry such as CPU and/or packet processing circuits enabled to manipulate network packets comprising graphics, audio and/or peripheral device data related to a remote computing session established between AS 102 and client 160. Further, DA 130 and BA 140 may comprise TCP/IP and UDP/IP network protocol stacks, packet encryption/decryption services such as AES-128, AES-256 and/or SALSA-20 encryption/decryption services, security functions such as Secure Socket Layer (SSL) protocol stack and certificate management functions.

According to the present specification, DA 130 and BA 140 are each designated as "authorized" intermediary appliances by the explicit presence of DACS 132 and BACS 142 in DA 130 and BA 140 respectively. System 100 may comprise additional non-authorized intermediary appliances, such as legacy or incompatible branch- and datacenter-appliances without explicitly approved connection services.

While the embodiment of system 100 depicted in FIG. 1 shows the paired intermediary appliance set DA 130 and BA 140, alternative embodiments of system 100 comprise any combination of single or paired authorized intermediary appliances coupled to network 180 in the path between AS 102 and client 160.

Figure 2:
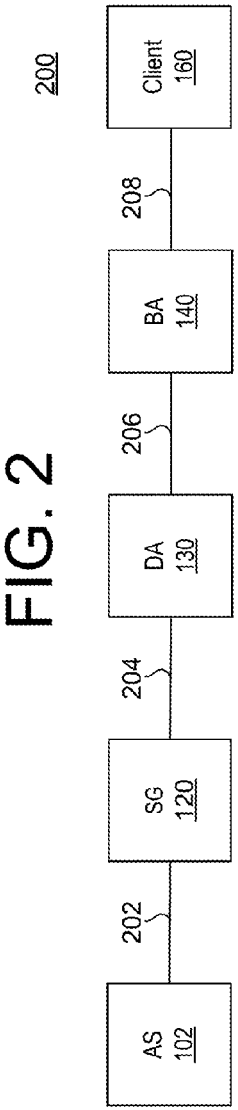
FIG. 2 is an illustration of one embodiment of a networked client-server system in which datacenter and branch appliances are located outside of a security gateway.
Figure 3:
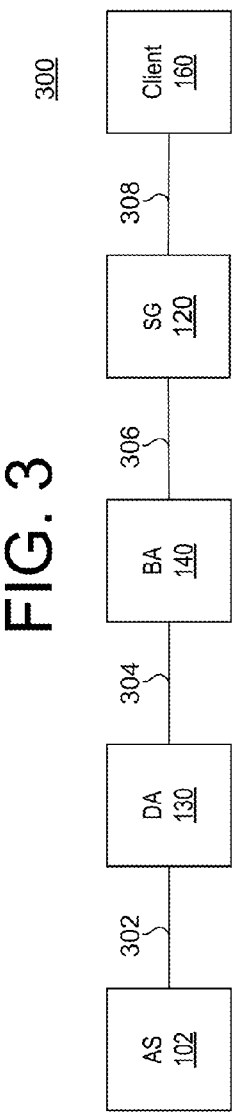
FIG. 3 is an illustration of one embodiment of a networked client-server system in which datacenter and branch appliances are located behind a security gateway.
Figure 4:
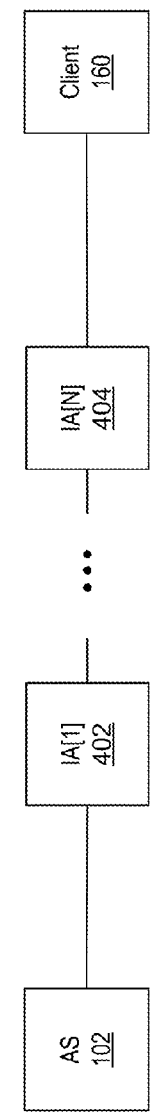
FIG. 4 is an illustration of one embodiment of a networked client-server system in which one or more intermediary appliances are coupled between a client and an application server.

FIG. 2, FIG. 3 and FIG. 4 illustrate three alternative network topologies in which the intermediary appliance authentication method described herein enables selective authentication of authorized intermediary appliances. FIG. 2 illustrates a network topology 200 in which SG 120 is configured between AS 102 and DA 130 such that datacenter network 202 is located behind SG 120 but corporate network 204 and private network 206 (between DA 130 and BA 140) are outside the security perimeter. In such an embodiment, BA 140 might be attached to a private branch network 208 which is further coupled to client 160. FIG. 3 illustrates an alternative topology 300 in which SG 120 is configured between BA 140 and client 160 such that datacenter network 302, private network 304 and private branch network 306 are located behind SG 120 (i.e., DA 130 is coupled to AS 102 by datacenter network 302 and to BA 140 by private network 304, BA 140 is further coupled to SG 120 by private branch network 306, and SG 120 is coupled to client 160 by network 308). An example of such a topology is a network in which individual clients (e.g., telecommuters) connect across the internet to a remote office and the remote office has an optimized connection 304 between branch office and corporate network in a distant geographic location. FIG. 4 illustrates another network topology 400 in which 'N' authorized intermediary appliances (shown as an authorized intermediary appliance 402 and an authorized intermediary appliance 404) are configured between AS 102 and client 160.

Figure 5:
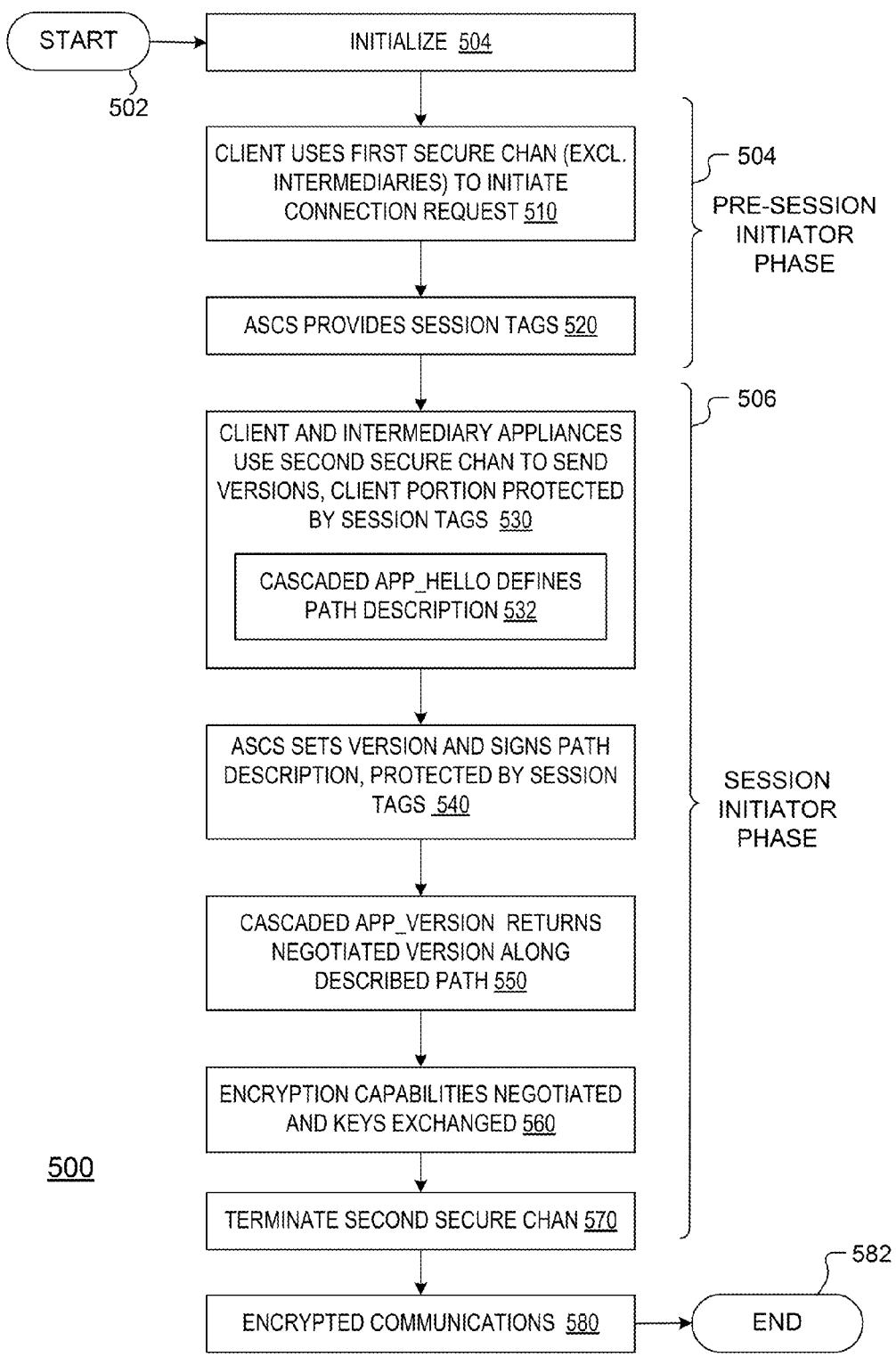
FIG. 5 is a flowchart illustrating a method in accordance with one or more embodiments of the present invention for establishing authenticated communications between a client and an application server, optionally including one or more authorized intermediary appliances.

FIG. 5 is a flowchart of a method 500 used to establish an authenticated communications path between client 160 and AS 102 that includes participation by a set of authorized intermediary appliances in accordance with one or more embodiments of the present invention. Method 500 starts at step 502 and proceeds to step 504 in which various apparatus of system 100, including AS 102, SG 120, DA 130, BA 140, CM 150 and client 160 are each initialized and attached to network 180, for example by registering with a reachable Domain Name Server (DNS), obtaining IP addresses and so on. While SG 120 is typically configured with an externally signed certificate, in different embodiments, SG 120 and/or AS 102 may be configured with ephemeral self-signed certificates generated, for example, by AS 102 or a trusted computer CM 150. In an embodiment, the certificates generated for session establishment have a limited life to reduce exposure risk. DA 130 and/or BA 140 may be configured as Certificate Authorities (CA) or may be entrusted with the certificates of SG 120 if located in the trust domain of SG 120.

Following initialization, method 500 proceeds with a pre-session initiator phase 504 comprising steps 510 and 520. During phase 504, authorized intermediary appliances DA 130 and BA 140 may provide generic switching or routing functions for TCP/IP communications between CCS 162 and servers such as AS 102, but are not participants in SSL-secured communications. At step 510 ("Client Uses First Secure Channel (excluding intermediaries) to Initiate Connection Request"), CCS 162 establishes a first leg of a first channel typically with CM 150 or SG 120 (i.e., a trusted computer) although some embodiments may utilize AS 102 as the endpoint for pre-session initiation. In an embodiment, the first leg is an SSL-secured connection over TCP/IP, based on the verifiable certificate of the trusted computer. The connection request from CCS 162 is typically initiated when a user at client 160 wishes to access a service provided by AS 102, for example by launching an application or web browser which prompts the user or retrieves stored address information (e.g., URL or FQDN) in order to initiate establishment of a secure channel with CM 150 or SG 120. CM 150 contacts AS 102 following which a second leg of the first channel is established between AS 102 and CM 150 based on the verifiable certificate of CM 150.

Method 500 proceeds to step 520 ("ASCS Provides Session Tags") in which ASCS 112 generates a set of session tags comprising a first secret intended for later use by all participants of session initiator phase 506 and a second secret for exclusive use between ASCS 112 and client CCS 162. The session tags are communicated to CCS 162 as one or more network payloads using the first secure channel and stored by both participants for subsequent use. An embodiment of such an exchange between ASCS 112 and CCS 162 is detailed in the method 700 described below.

Following a successful pre-session initiator phase 504, method 500 proceeds with session initiator phase 506 which comprises steps 530-570 described below. If pre-session initiator phase 504 is unsuccessful, for example in cases where CM 150 is unreachable, client 160 may inform the user of the failed connection attempt. During the session initiator phase 506, ASCS 112 uses the second secret to establish trust in a second secure channel between CCS 162 and ASCS 112 including authorized intermediary appliances, including signing a path description and negotiating a version to prevent either downgrade attacks or attempts by non-authorized intermediaries to join the path.

At step 530 ("Client and Intermediary Appliances Use Second Secure Channel to Send Versions, Client Portion Protected by Session Tags"), CCS 162 establishes the second secure channel with ASCS 112, the second secure channel comprising a chain of secured connections (e.g., SSL over TCP/IP) inclusive of authorized intermediary appliances DA 130 and BA 140. Subsequent to establishment of the second secure channel, CCS 162 initiates a version request in which participant version information (comprising device identity and optionally protocol and/or application version preferences) for the client and authorized intermediaries wishing to participate in pending application (APP) level communications, is compiled as a path description and forwarded to ASCS 112 by means of a suitable hello message protocol, for example cascaded APP_HELLO 532 over the second secure connection chain as detailed in the method 900 described below. In an embodiment, the path description is compiled as a series of eXtensible Markup Language (XML) stanzas wrapped in HTTP POST frames, commencing with the client version in XML format; to which each participating intermediary appends its own version information in XML format and communicates the modified XML message in the server facing direction of ASCS 112.

As a next step 540 ("ASCS Sets Version and Signs Path Description, Protected by Session Tags"), an embodiment of which is detailed in step 910 of the method 900 described below, the ASCS 112 validates the version request to establish trust in the second secure channel by i) verifying information of the client computer presented by CCS 162 against separately held session tags (e.g., verifying a session identity presented in the client version information), ii) optionally selecting a protocol version (e.g., if multiple protocol versions are presented by one or more participants), and iii) signing the path description to prevent subsequent tampering. As a next step 550 ("Cascaded APP_VERSION Returns Negotiated Version along Described Path"), a cascaded APP_VERSION response (detailed in the method 1000 described below) is used to echo the negotiated version to the client 160 along the path comprising the intermediary appliances listed in the path description.

Method 500 proceeds to step 560 in which encryption capabilities are negotiated, and encryption keys and other session parameters related to a pending application session between AS 102 and client 160 are exchanged (between AS 102 and client 160) over the second secure connection with the intermediary appliance DA 130 and BA 140 enabled to eavesdrop the exchange and retrieve pertinent session parameters. An embodiment of such an exchange of session parameters is detailed in the method 1100 described below.

Method 500 proceeds to step 570 in which the second secure connection between CCS 162 and ASCS 112 expires or is torn down. In an embodiment, the second secure connection expires before the initiation of encrypted communications between client 160 and AS 102 using a third secure channel secured and trusted using the encryption keys, shown as step 580 ("Encrypted Communications") in which DA 130 and BA 140 are active participants. An example of such encrypted communications comprises IPSec Encapsulated Security Payload (ESP) secured UDP messages comprising media data exchanged as part of the application session, generally decrypted, processed and re-encrypted by DA 130 and BA 140 in a manner transparent to AS 102 or client 160. In some embodiments, the second secure connection expires during or after such encrypted communications. For example, the second secure connection may be maintained so that a client can communicate operational instructions to a target authorized intermediary appliance in a secure manner, even after session parameters have been exchanged. Method 500 ends at step 582 ('End').

Figure 6:
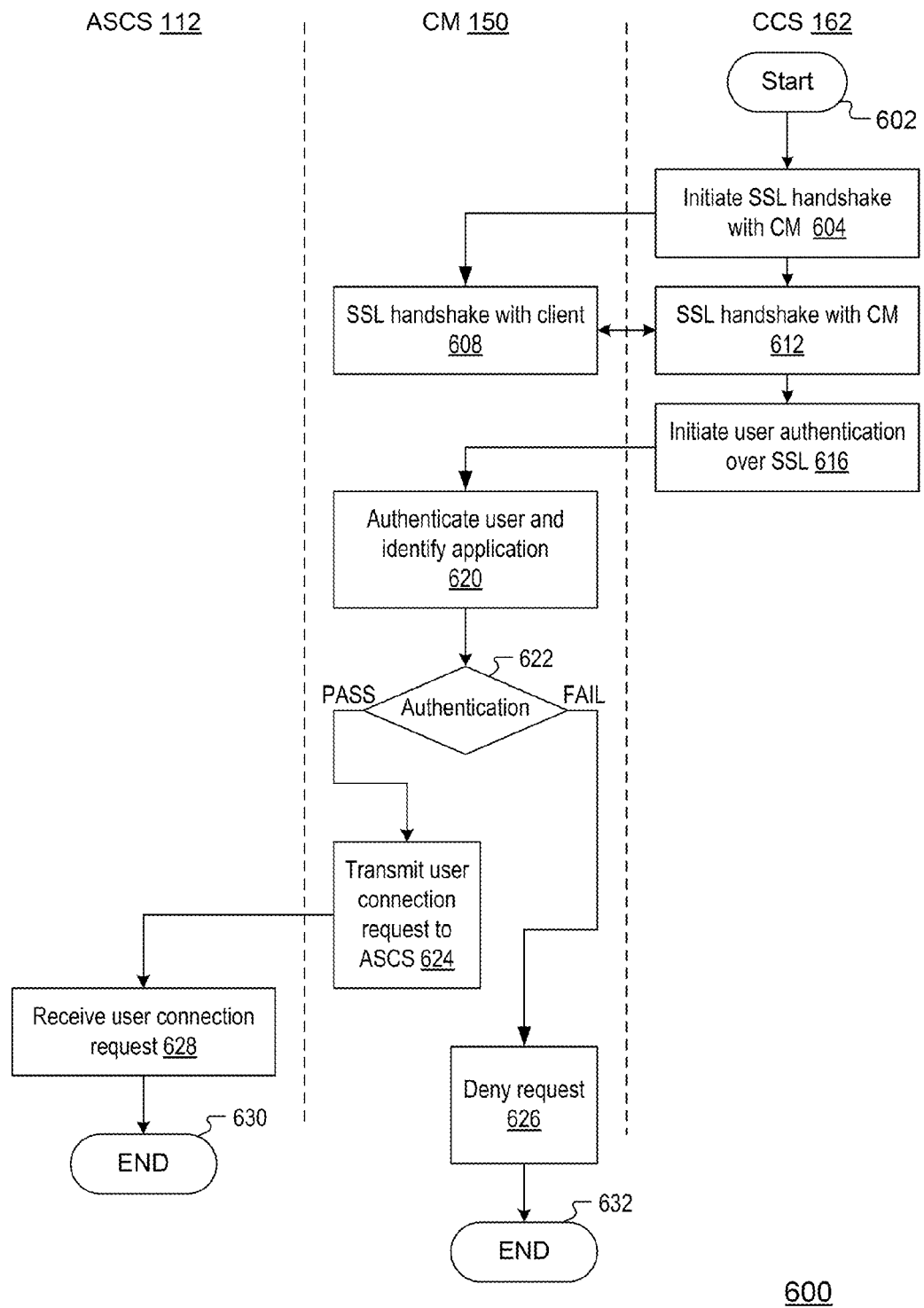
FIG. 6 is a flowchart illustrating a method initiated by a client for requesting a connection with a server in accordance with one or more embodiments of the present invention.

FIG. 6 is a flowchart of a method 600 initiated by client 160 to request a connection with AS 102 in accordance with one or more embodiments of the present invention. Method 600 comprises steps executed by each of CCS 162, CM 150 and ASCS 112. Method 600 starts at step 602 and proceeds to step 604 in which CCS 162 initiates an SSL connection with CM 150. Generally, CM 150 is accessed by establishing a connection with SG 120 and SG 120 provides proxy services to access CM 150 using a pre-assigned network socket. In the absence of a security gateway an SSL connection is established directly with CM 150. In an embodiment, CCS 162 initializes an SSL software library (e.g., OpenSSL library), selects an SSL protocol version (e.g., SSLv2, SSLv3, TLSv1, or the like), initializes local SSL software structures and creates a TCP/IP socket for the server connection. CCS 162 sends a CLIENT_HELLO message to CM 150 to initiate an SSL connection.

Method 600 proceeds to step 608 ('SSL Handshake with Client') executed by CM 150 in which an SSL connection request from CCS 162 is detected and accepted by responding to the received CLIENT_HELLO with a SERVER_HELLO message. Step 608 continues in tandem with step 612 ('SSL Handshake with CM') executed by CCS 162 in which cryptographic keys are exchanged using SSL handshake methods known to the art (e.g. calling SSL_accept( ) on an SSL server (i.e., CM 150) and SSL_connect( ) on the SSL client (i.e., client 160)).

Following the SSL handshake at steps 608/612, CCS 162 initiates user authentication over the SSL connection as step 616 by communicating user credentials to CM 150. CM 150 responds at step 620 ('Authenticate User and Identify Application') by authenticating the user (e.g., authentication against credentials maintained in an Active Directory) and determining server-side connectivity requirements (e.g., in an embodiment, CM 150 selects a particular AS 102 and a particular ASCS (associated with a particular VDI desktop, hosted shared desktop or hosted application for example) based on the user credentials). CM 150 transmits a user connection request to the identified ASCS, such as ASCS 112, as a next step 624 if user authentication passes at step 622. If user authentication fails at step 622, CM 150 denies the user connection request at step 626, for example by notifying CCS 162 and terminating the SSL connection at step 632.

Method 600 proceeds from step 624 to step 628 ('Receive user connection request') executed by ASCS 112 of AS 102 in which ASCS 112 receives a message from CM 150 requesting a connection associated with the designated and authenticated user. The method 600 then proceeds to step 630 where it ends.

Figure 7:
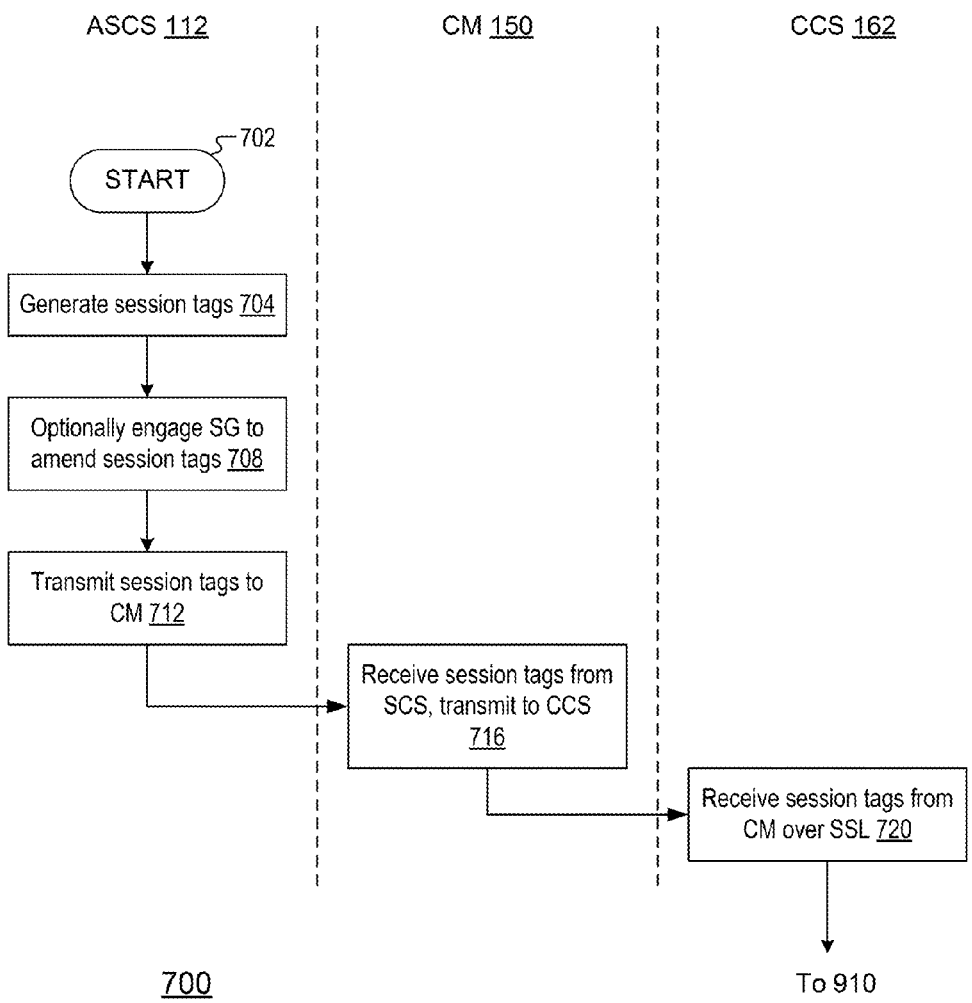
FIG. 7 is a flowchart illustrating a method in which session tags are communicated to a client associated with an authenticated user in accordance with one or more embodiments of the present invention.

FIG. 7 is a flowchart of a method 700 in which session tags are provided to a client 160 in response to an authenticated user and in anticipation of a granted connection in accordance with one or more embodiments of the present invention. Method 700 is generally a continuation from conversation 600 of FIG. 6. The method 700 begins at step 702 and proceeds to step 704 ('Generate session tags'); in some embodiments where the method 700 is a continuation of the method 600, step 704 is preceded by step 628 of the method 600. In an embodiment, ASCS 112 generates a Session Identity (SID), e.g., in the form of a 64-bit random value which, when used in conjunction with per-session certificates, maintains a wide entropy in the session tags, thereby ensuring that legacy clients (e.g., clients utilizing legacy certificates) are nevertheless enabled for secure application sessions with AS 102. The SID is algorithmically combined with the server certificate (to be associated with the same application session) as a 'thumbprint hash value' (alternatively termed a 'thumbprint' herein). An example of the generation and use of such a thumbprint is described by method 1200 of FIG. 12 described below. In addition to the thumbprint (i.e. the first secret of method 500), the session tags comprise the SID and a nonce value that enables ASCS 112 and CCS 162 to share secrets during the session initiator phase 506 exclusive of any intermediary appliances. The SID, thumbprint and nonce together comprise the second secret of method 500. In an embodiment, the nonce comprises a 64-bit random value which is stored by ASCS 112 and CCS 162 for the duration of the session initiator.

In some embodiments, the session tags further comprise additional connection information, such as a Fully Qualified Domain Name (FQDN) or other hostname for a particular host ASCS 112), and/or encryption keys for scrambling data communicated during the session initiator phase.

The session tags are optionally passed to SG 120 at step 708, to provide SG 120 with the connection information and/or provide SG 120 an opportunity to amend the session tags, e.g. substitution of FQDN or hostname. In an exemplary embodiment in which SG 120 maintains an externally signed certificate, SG 120 replaces the thumbprint hash value generated by ASCS 112 with a thumbprint hash value based on its own certificate and returns the amended session tags to ASCS 112.

As a next step 712, ASCS 112 grants a connection to the CCS 162 by communicating the session tags to the CM 150. The CM 150 receives the session tags at step 716 and grants the CCS 162 a connection by communicating the session tags to the CCS 162 using the first secure channel. The CCS 162 receives the session tags from the CM 150 at step 720.

On successful completion of the pre-session initiator phase 504 (i.e., successful completion of the methods 600 and 700) in which CCS 162 received session tags from CM 150, CCS 162 initiates the session initiator phase 506 and the method 700 proceeds from step 720 to step 910 of method 900, where the method 900 is one embodiment of the method 800 described below. During the session initiator phase 506, version information is communicated to ASCS 112. The client version comprising SID (and optionally client protocol version and/or additional client capabilities) is signed using the session tags including the nonce (i.e., the second secret) and passed along the path of participating authorized intermediary appliances, each appending its own identity and/or version as additional version information to the path description. Intermediary appliances are not in possession of the nonce and are therefore unable to tamper with the client portion of the version information without detection by ASCS 112.

Figure 8:
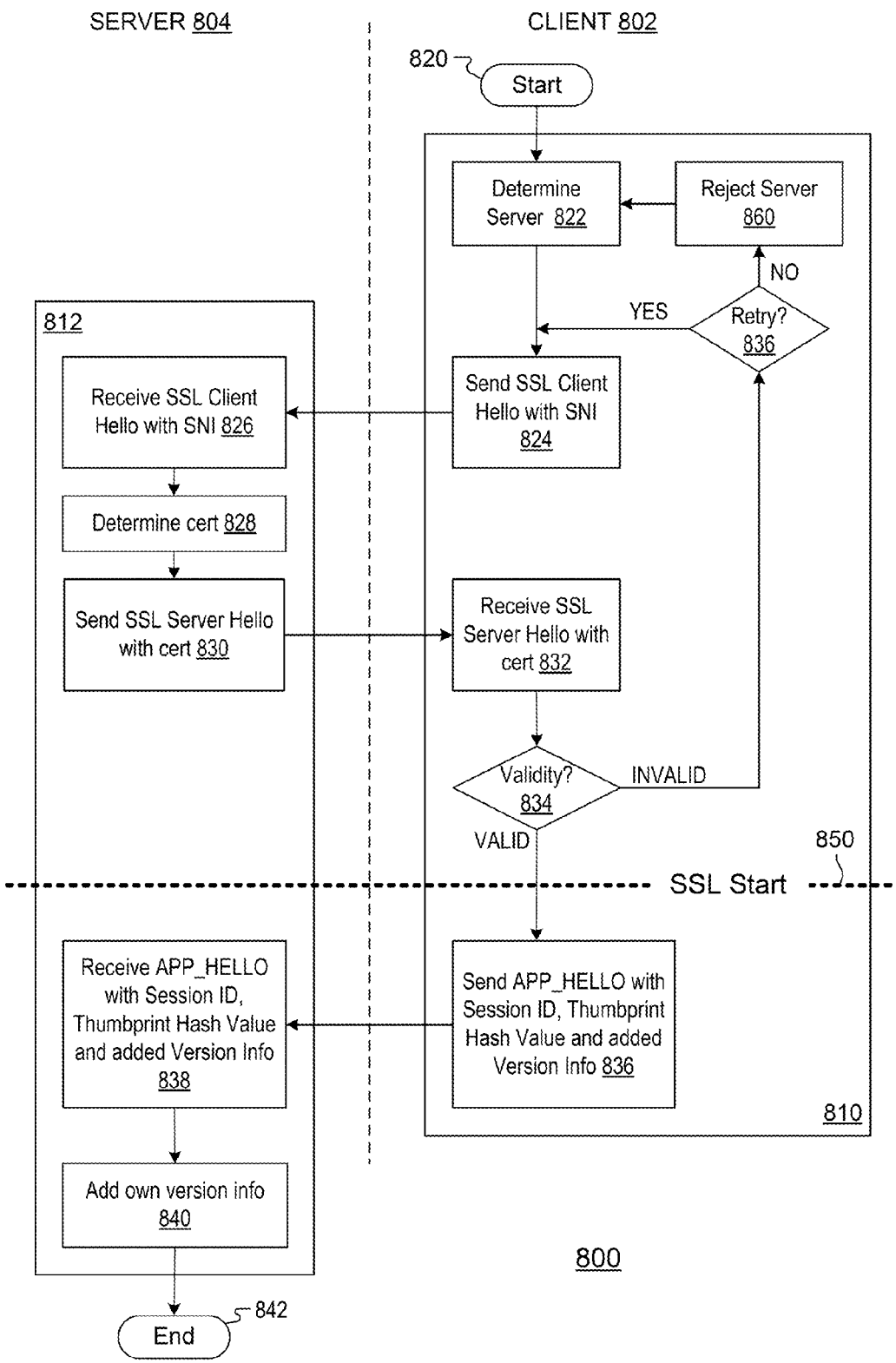
FIG. 8 is a flowchart illustrating a method for communicating client version information from a client to a server in accordance with one or more embodiments of the present invention.

FIG. 8 is a flowchart of a method 800 for communicating client version information from a client 802 to a server 804 in accordance with one or more embodiments of the present invention. While client 160 assumes the role of 'client 802' and BA 140 assumes the role of 'server 804' for the initial segment of the session version request, the method 800 is repeated with BA 140 assuming the role of 'client 802' and DA 130 assuming the role of 'server 804' for the next segment of the session version request and so on down the line of additional intermediaries (if present) for additional segments of the session version request conversation. If any intermediary appliance is non-authorized, the designated client rejects it from the AS 102 'server-facing' communication path and attempts a session version request with the next server in line towards AS 102 (while maintaining previously established secure connections in the client 160 'client facing' direction), generally facilitated by the non-authorized intermediary appliance which is obliged to operate as a router between the client and the next server in the server-facing direction. Such a path including intermediaries is generally pre-configured using routing tables to direct traffic along determined network links through particular appliances and assumes the network 180 is physically wired accordingly. The client 160 typically addresses server entities (e.g., SG 120, CM 150 or AS 102) directly using appropriate server addresses (i.e., IP layer address designations) in which the intermediaries are transparent to the client from an IP addressing perspective.

Method 800, comprising a first sequence of steps 810 (i.e., steps 824, 832, 834, and 836) executed by a client 802 and a second sequence of steps 812 (i.e., steps 826, 828, 830, 838, and 840) executed by a server 804, starts at step 820 and proceeds to step 822 in which a target server is determined, for example as determined by routing tables. If a previously determined server has been rejected, the rejected server generally operates as an IP router and the next server in the path toward AS 102 is selected. Method 800 then proceeds to step 824 in which client 802 sends an SSL CLIENT_HELLO message to server 804 determined at step 822. In an embodiment, client 802 identifies CM 150 as the connection target by populating the Server Name Indication (SNI) field inherent in SSL protocol standards with the FQDN of CM 150 (or SG 120 if the connection manager is proxied). Alternatively, server name information is placed in another (typically 'clear text') pre-defined header field, to enable inspection by intermediaries.

Server 804 receives the SSL CLIENT_HELLO with SNI information at step 826 and retrieves an appropriate signed certificate at step 828 for valid SNI parameters (e.g., server 804 typically retrieves one from a selection of certificates related to a particular connection manager, such as the CM 150, specified by the SNI parameter). If the SNI field is null or invalid, server 804 may i) operate as an IP switch or router (i.e., not intercept the message) or ii) retrieve a legacy certificate in different embodiments. The server 804 responds to client 802 by sending an SSL SERVER_HELLO message with the appropriate certificate at step 830. Client 802 receives the SSL SERVER_HELLO message with the signed certificate from server 804 at step 832 and determines the certificate validity at step 834. In some embodiments in which the client 802 maintains a certificate store, client 802 determines the validity and accepts the connection based on a presented name and a CA chain or in cases of an ephemerally signed certificate, it may be validated against the thumbprint hash value. In some embodiments, the client 802 executes a sequence of checks at step 834 in an attempt to confirm the signature until the certificate is either validated by one of the checks or eventually rejected by all the checks.

If the credentials are determined invalid at step 834, client 802 may determine at step 836 to re-attempt an SSL SERVER_HELLO (i.e., repeat steps 824 and 832). If the server 804 continues to send invalid certificates at step 830 (e.g., 5 iterations of step 836 in a typical embodiment) or if an extended time elapses without a server response (e.g., five seconds), client 802 proceeds to step 860.

In an embodiment, step 860 comprises client 802 performing the steps of i) tearing down the SSL session ii) sending an SSL SESSION_REJECT message and iii) awaiting for a corresponding SSL SESSION_REJECTED message from server 804. An authorized intermediary appliance is expected to respond to a rejection in such a manner, including allowing network traffic to pass through it following the SSL rejection (i.e., operating as a router). Following receipt of an SSL SESSION_REJECTED message from server 804, client 802 typically returns to step 822 in which the next intermediary appliance down the line is selected as the server. Thereafter step 824 is repeated for the new server while maintaining any established SSL connections in the client-facing direction in a blocked state.

If the credentials satisfy the client 802 (i.e., the certificates succeed) at step 834, an SSL session is established (ref. timeline 850) and the client 802 sends an APP_HELLO with the SID and thumbprint hash value (received by the client at step 720 of the method 700 previously described) in addition to added version information in the SSL session at step 836. The 'added version information' specifies either i) the client capabilities, for example comprising supported application protocol versions (e.g., type and/or version numbers of a remote computing protocol) in the embodiments where client 802 is the client 160 comprising client service CCS 162 or ii) intermediary appliance identity (e.g., a per-device identity assigned by a manufacturer) and optionally version information (e.g., appliance version and/or supported protocol versions) in the embodiments where the role of client 802 is executed by an authorized intermediary appliance.

As a next step 838, the server 804 receives the APP_HELLO with SID, thumbprint hash value and the added version information and appends its own version information to the APP_HELLO stanza at step 840. The method 800 then proceeds to step 842 where it ends.

If there are additional intermediary appliances in the path to AS 102, the method 800 repeats with the server 804 then entering a client role (i.e., that of client 802) and attempting to establish an SSL connection with the next server 804 in the path.

Figure 9:
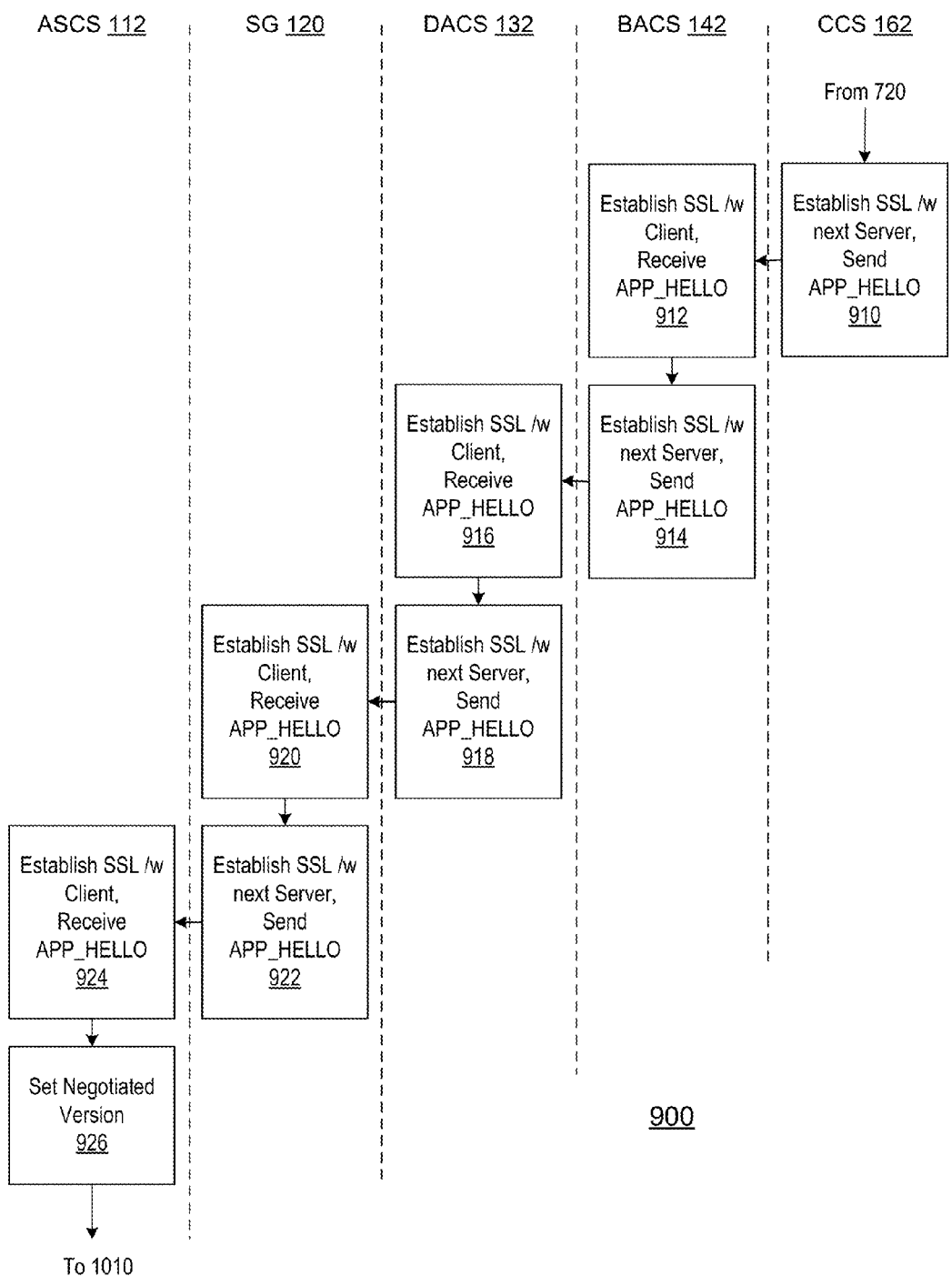
FIG. 9 is a flowchart illustrating a method in which version information related to a client and authorized chain of intermediary appliances is communicated to an application server in accordance with one or more embodiments of the present invention.

FIG. 9 is a flowchart illustrating a method 900 in which version information for a client 160 and authorized chain of intermediary appliances (such as BA 140 and DA 130) is communicated to ASCS 112 in accordance with one or more embodiments of the present invention. Method 900 is one embodiment of the method 800 described above and commences, following step 720 of method 700, at step 920.

At step 910, CCS 162 performs the client role of communicating version information to a server (i.e., BACS 142) as generally described for the sequence of steps 810 of method 800. At step 912, BACS 142 performs a server role of receiving version information from CCS 162 as generally described for the sequence of steps 812 of method 800.

At step 914, BACS 142 performs the client role of communicating version information with added BACS version information to a server (i.e., DACS 132) as generally described for the sequence of steps 810 of method 800. At step 916, DACS 132 performs a server role of receiving version information with added BACS version from BACS 142 as generally described for the sequence of steps 812 of method 800.

At step 918, DACS 132 performs the client role of communicating version information with added BACS and DACS version information to a server (i.e., SG 120) as generally described for the sequence of steps 810 of method 800. At step 920, SG 120 performs a server role of receiving version information (with added BACS and DACS version information) as generally described for the sequence of steps 812 of method 800.

At step 922, SG 120 performs the client role of communicating the accumulated version information (comprising the signed client portion and the appended BACS and DACS version information) to a server (i.e., ASCS 112) as generally described for the sequence of steps 810 of method 800. While the SG 120 may not necessarily contribute its own version information to the SESSION_HELLO stanza, it may replace the SNI of CM 150 with the SNI for ASCS 112 when initiating a CLIENT_HELLO (ref. step 824 of the method 800). At step 924, ASCS 112 performs a server role of receiving the accumulated version information as generally described for the sequence of steps 812 of method 800.

At step 926 ('Set Negotiated Version'), ASCS 112 determines the negotiated version by, at a minimum, verifying the SID presented as the client version, and optionally selecting an application/and or protocol version common to all participants (e.g., the highest common protocol version in a typical embodiment) in the chain and prepares an APP_VERSION response stanza comprising i) a path description which comprises the list of versions for all authorized participants, and ii) the negotiated version. The path description is signed with the session tags (i.e., the second secret) to prevent intermediary appliances being added or withdrawn from the path. In an embodiment, the negotiated version is also signed to prevent a malicious downgrade attack by an intermediary appliance. The method 900 then proceeds to step 1010 of method 1000, described below.

Figure 10:
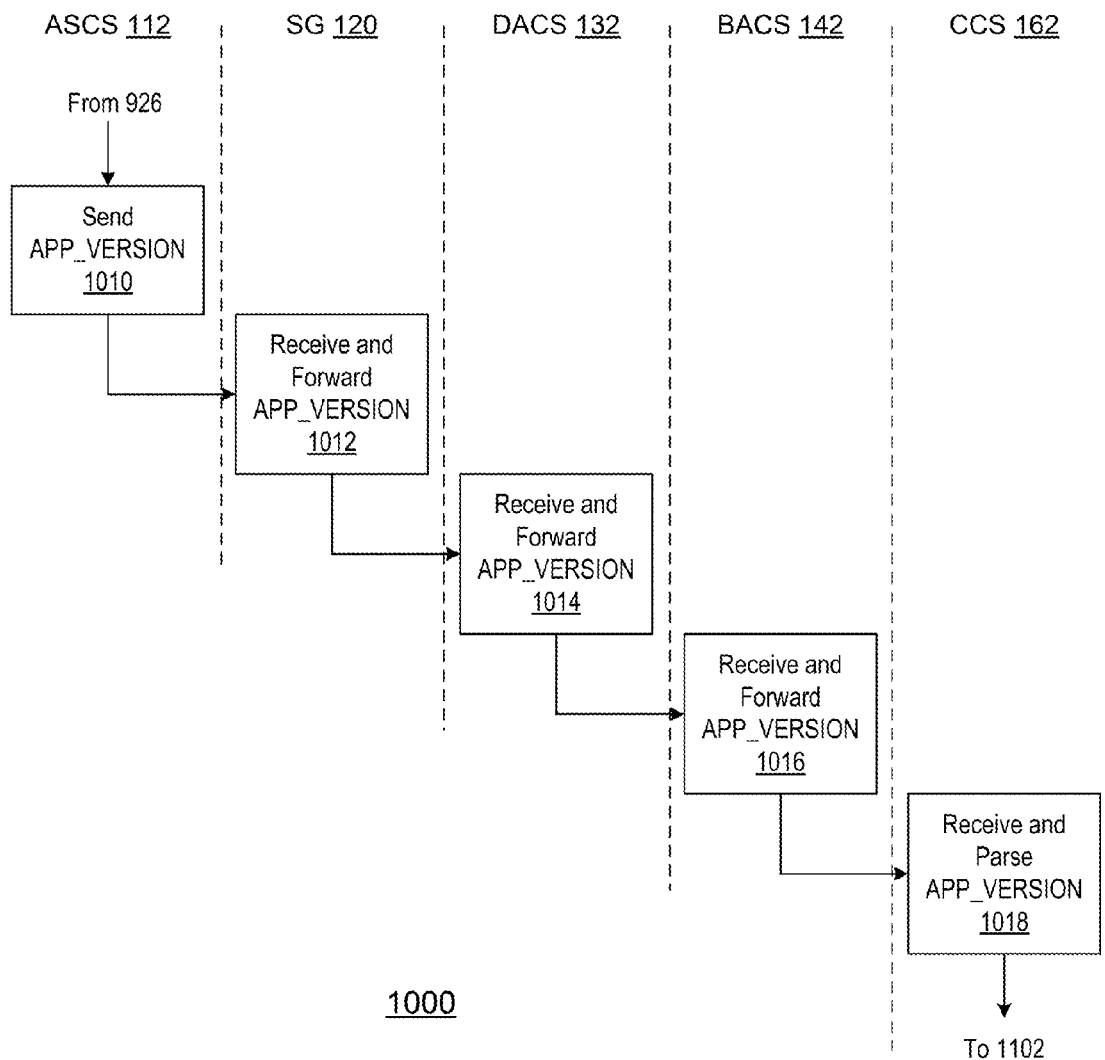
FIG. 10 is a flowchart illustrating a method in which a negotiated version is communicated from an application server to a client in accordance with one or more embodiments of the present invention.

FIG. 10 is a flowchart illustrating a method 1000 in which the negotiated version and signed path description determined at step 910 is communicated from AS 102 back to the client 160 in accordance with one or more embodiments of the present invention. Method 1000 and commences, following step 926 of the method 900, at step 1010 ('Send APP_VERSION') in which the negotiated version and signed path description is sent from ASCS 112 to SG 120.

At step 1012, the SG 120 receives the APP_VERSION message and forwards it to the DACS 132. At step 1014, the DACS 132 receives the APP_VERSION message and forwards it to the BACS 142. At step 1016, the BACS 142 receives the APP_VERSION message and forwards it to the CCS 162. Each authorized intermediary appliance generally retains a copy of the negotiated version for reference in subsequent processing decisions.

At step 1018, the CCS 162 receives the negotiated version and path description, verifies the presence and validity of the returned signature by parsing the XML that describes the path description, and prepares for an exchange of encryption keys if the negotiated version specified at step 910 is accepted. If any of the version stanzas in the path description comprise mistrustful data (e.g., a modified version for a particular appliance), the signature communicated at step 1010 is determined by the CCS 162 as not matching the path description and the CCS 162 typically closes the SSL socket. In some embodiments, client 162 utilizes the APP_VERSION path description stanza to index authorized intermediary appliances for future communications such as configuring operational settings of a particular appliance directly. In one embodiment, each authorized intermediary appliance is assigned an index based on the position of the intermediary appliance in the chain as determined by parsing the APP_VERSION path description XML stanza. Control parameters are passed to a particular intermediary appliance utilizing the index in subsequent XML communication stanzas. In another embodiment, intermediary appliances append addressing information such as IP address, port number, encryption keys and/or protocol specification by which client 162 may contact the authorized intermediary appliance out of band at a subsequent time.

The method 1000 proceeds from step 1018 to step 1102 of the method 1100, described below.

Figure 11:
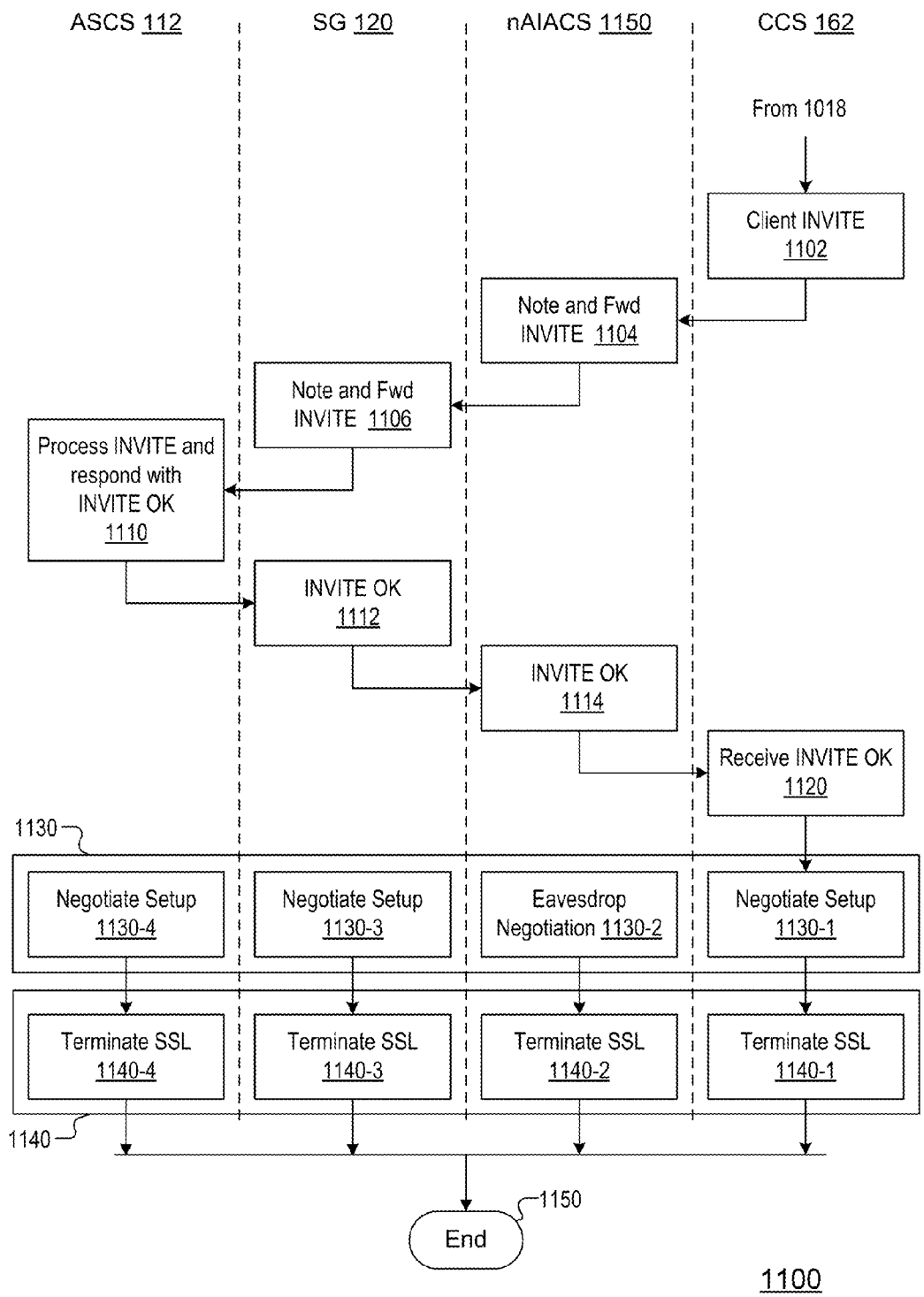
FIG. 11 is a flowchart illustrating a method in which a client initiates an exchange of setup parameters for an application session in accordance with one or more embodiments of the present invention.

FIG. 11 is a flowchart illustrating a method 1100 in which, in accordance with one or more embodiments of the present invention, the client 160 initiates a process with the AS 102 in order for an encryption version (e.g., AES-128-GCM or AES-256-GCM) to be negotiated, associated encryption keys to be exchanged, and optionally additional setup parameters associated with a pending application session to be negotiated. Method 1100 commences, following step 1018 of method 1000, at step 1102 ('Client INVITE') in which CCS 162 sends an INVITE message to ASCS 112 via the existing chain of 'N' authorized intermediary appliance connection services (shown as nAIACS 1150, for example comprising BACS 142 chained with DACS 132) and SG 120. The INVITE message contains the encryption capabilities that CCS 162 is willing to use.

At step 1104, each authorized intermediary appliance of nAIACS 1150 forwards the INVITE message to the next authorized intermediary appliance in the chain (e.g., BACS 142 forwards the message to DACS 132), and the final authorized intermediary appliance in the chain (e.g., DACS 132) forwards the INVITE message to SG 120, taking note of parameters associated with each of the encryption capabilities advertised by the client until confirmation of negotiated cipher and key sets in the subsequent INVITE OK. If the INVITE message does not contain any expected encryption capabilities, nAIACS 1150 (i.e., BACS 142 and DACS 132 as depicted in FIG. 1) is expected to allow the session to continue normally and act as a router for traffic in both directions. At step 1106 SG 120 forwards the INVITE message to ASCS 112.

ASCS 112 processes the INVITE message at step 1110 by first confirming the SID in the INVITE message matches the SID on record. If not, ASCS 112 may respond to the INVITE with an UNACCEPTABLE message and the session will be terminated. When the SID is confirmed, ASCS 112 determines which encryption algorithm shall be used and responds to the received INVITE with an INVITE OK message to the SG 120 that points nAIACS 1150 to relevant parameters from the previous INVITE message as well as parameters that will be used for messages from ASCS 112. At step 1112, SG 120 parses the INVITE OK and forwards it to nAIACS 1150. At step 1114, nAIACS 1150 parses the INVITE OK and forwards it to CCS 162 (i.e., as depicted in FIG. 1, the DACS 132 parses the INVITE OK and forwards it to BACS 142, which parses the INVITE OK and forward it to CCS 162). If any participant receives a garbage or out of order message, the participant generally closes the SSL connection and abandons the session. At step 1120 the CCS 162 receives the INVITE OK and accepts the negotiated encryption algorithm and parameters.

As a next step 1130 (comprising 1130-1 'Negotiate Setup' for CCS 162, 1130-2 'Eavesdrop Negotiation' for nAIACS 1150, 1130-3 'Negotiate Setup' for SG 120, and 1130-4 'Negotiate Setup' for ASCS 112), setup information is exchanged between ASCS 112, SG 120 and CCS162, including encryption keys (e.g., UDP encryption keys) utilized for encrypting data related to the pending application session. Additionally, nAIACS 1150 may monitor the setup and control data exchanged between SC 120 and CCS 162, and in particular retain encryption keys. nAIACS 1150 use the keys to intercept, decode, process and re-encode data associated with the application session as determined by the capabilities of the authorized intermediary appliance(s), either following the completion of key exchanges (ref. steps 1130 and step 1132) or after the SSL connection has terminated. In some embodiments, the SSL connection remains active for a determined period following the exchange of keys. As a next step 1140 (shown as 1140-1, 1140-2, 1140-3 and 1140-4 'Terminate SSL' for CCS 162, nAIACS 1150, SG 120 and ASCS 112, respectively), the SSL connection is torn down once the exchange of setup and control information has completed. The method 1100 then proceeds to step 1150 where it ends.

Figure 12:
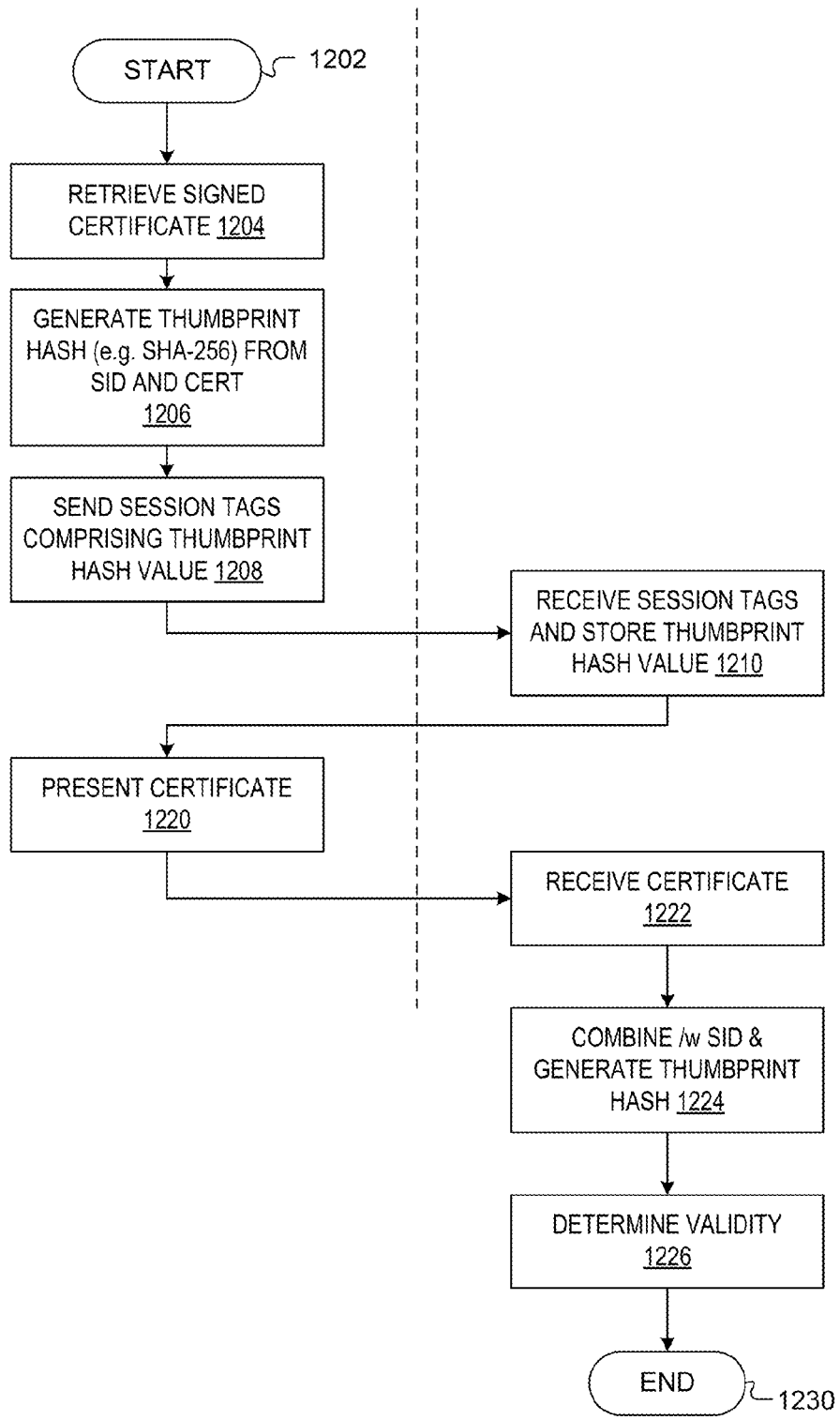
FIG. 12 is a flowchart illustrating a method executed by an application server and a client that enables certificate verification without burdening the client with a traditional certificate validation process in accordance with one or more embodiments of the present invention.

FIG. 12 is a flowchart illustrating a method 1200, in accordance with one or more embodiments of the present invention, executed by an ASCS 112 and a CCS 162 which enables authentication without burdening the client 160 with a traditional certificate validation process. Method 1200 starts at 1202 and proceeds to step 1204 in which ASCS 112 retrieves a signed and typically public certificate. As a next step 1206, ASCS 112 generates a random SID such as random 64-bit number. A thumbprint hash value is then derived from a combination of the SID and the certificate. In one embodiment, the SID is concatenated with the certificate and the resultant concatenation hashed using a Secure Hash Algorithm (SHA) such as a SHA-256 hash to generate a thumbprint hash value. In another embodiment, the SID is itself hashed (e.g., using a SHA-256 hash) prior to concatenation with the certificate, followed by a second hashing function to generate the thumbprint hash value; thereby enabling authorized intermediaries to generate thumbprint hash values without possession of the SID.

As a next step 1208, the thumbprint hash value generated at step 1206 is sent to the CCS 162 as part of the session tags (ref. step 712 of the method 700). CCS 162 receives the session tags at step 1210 and stores the server thumbprint hash value and SID for subsequent certificate validation. As previously described with respect to the method 500, the session tags further comprise a nonce used for trusted data exchanges between ASCS 112 and CCS 162, excluding authorized intermediaries.

The method 1200 proceeds to step 1220 in which ASCS 112 presents a certificate to CCS 162 for validation. In some embodiments, step 1220 may be part of step 1110 of the method 1110. CCS 162 receives the certificate at step 1222 (e.g., correlating with step 1120 in method 1100) and at step 1224, generates a second thumbprint hash value by concatenating the presented certificate with the SID stored at step 1210.

As a next step 1226, CCS 162 determines the validity of the presented certificate by comparing the second thumbprint hash value generated at step 1224 with the server thumbprint hash value stored at step 1210. The presented certificate is validated by matching thumbprint values. If the presented certificate is validated, trust in the server is established (for example an SSL session setup is completed (ref. timeline 850 in method 800)). If the presented certificate is determined to be invalid, any pending SSL connection is typically torn down and the server rejected (ref. step 860 in method 800). Method 1200 then ends at step 1240. In some embodiments, the thumbprint hash value provided in the session tags is generated by SG 120 rather than ASCS 112.

Figure 13:
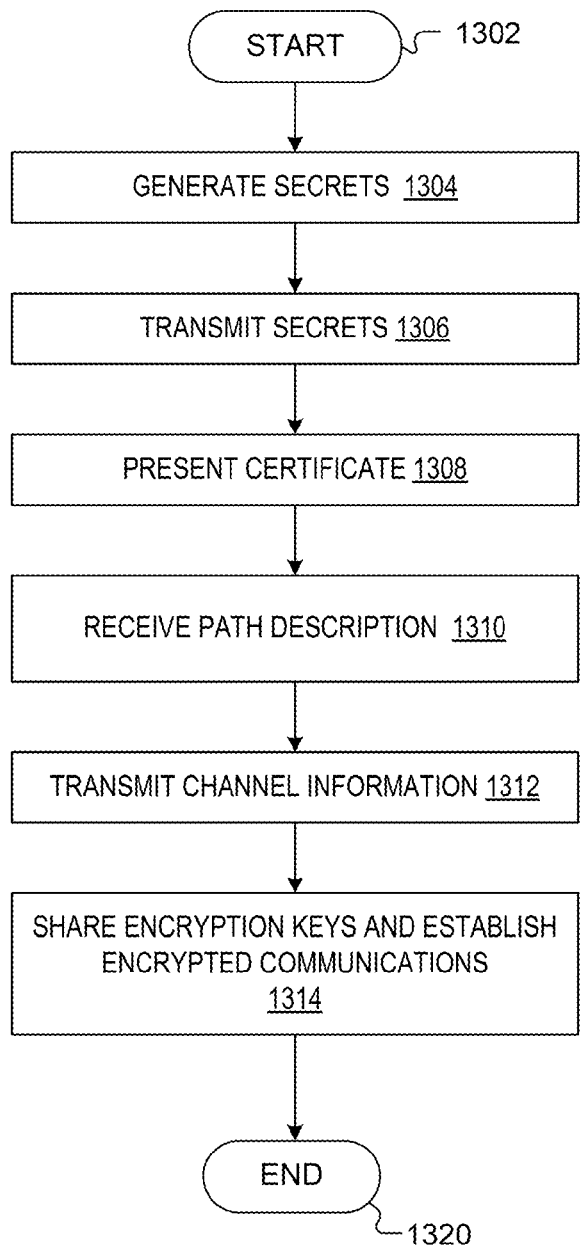
FIG. 13 is a flowchart illustrating a method, in accordance with one or more embodiments of the present invention, executed by an ASCS for establishing encrypted communications.

FIG. 13 is a flowchart illustrating a method 1300, in accordance with one or more embodiments of the present invention, executed by an ASCS 112 for establishing encrypted communications. Method 1300 starts at step 1302 and proceeds to step 1304 in which two secrets are generated from a certificate, for example the session tags generated by ASCS 112 at step 704 of method 700. In an embodiment, the certificate is a self-signed certificate generated by AS 102 and is untraceable to any CA. In an embodiment, the first secret comprises a thumbprint determined as a hashed combination of the certificate, and a cryptographically random session identifier (SID); the first secret intended for sharing between the client 160 and the AS 102 inclusive of one or more authorized intermediary appliances and the second secret comprises the thumbprint, the SID and a nonce, the second secret intended for sharing between the client 160 and the AS 102 exclusive of the authorized intermediary appliances.

As a next step 1306, the secrets are transmitted from AS 102 to client 106 over a previously established first channel secured and trusted based on a trusted computer CM 150, for example as sent from ASCS 112 to CCS 162 using steps 712, 716 and 720 of method 700. The trusted computer CM 150 is trusted by AS 102 and client 160 based on a verifiable certificate of the trusted computer CM 150. In an embodiment, a first leg of the first channel is established between client 160 and CM 150 based on a verifiable certificate of the trusted computer CM 150 and a second leg of the first channel is established between the AS 102 and the CM 150 based on the verifiable certificate. The trusted computer CM 150 routes payloads comprising the first and second secrets between the AS 102 and client 160 (i.e. between the first leg and the second leg). As an example, the secrets are generated and transmitted in response to a request, received via the first leg of the first channel, to establish a second secure and trusted channel between client 160 and AS 102; i.e., (i) the first channel is established by the AS 102 addressing first communications to the trusted computer CM 150 and the client 160 addressing second communications to the trusted computer, and (ii) the second channel is established by the client 160 addressing third communications to the AS 102.

As a next step 1308, in response to a secure channel request from an authorized intermediary appliance (ref. DA 130), AS 102 presents the certificate to the DA 130. In some embodiments such as steps 922 and 924 of method 900, the certificate is presented to SG 120 which has previously established a secure channel with DA 130 at steps 918 and 920 of method 900. In an embodiment, the secure channel request is a Secure Socket Layer (SSL) cryptographic protocol hello request over a reliable transport layer such as TCP/IP. The DA 130 determines a trustworthiness of the sever AS 102 based on the certificate and the first secret held by the DA 130. Presenting the certificate to the DA 130 enables DA 130 to determine the trustworthiness of AS 102 based on first secret.

As a next step 1310, an embodiment of which is depicted at step 924 of method 900, AS 102 receives a description of a second channel from the DA 130 located between AS 102 and client 160. The description of the second channel comprises (i) a path description which has been amended by, is visible to, and identifies at least one authorized intermediary appliance in a path of the second channel (i.e., the path describing DA 130 and optionally additional authorized intermediary appliances on the path between the client 160 and AS 102), and (ii) client information such as a SID or combination of SID and thumbprint from the client 160 signed by the second secret. The AS 102 establishes trust in the second channel by having the second secret and client information signed by the second secret.

As a next step 1312, channel information is transmitted via the second channel from AS 102 to client 160 once AS 102 has established trust in the second channel, for example as illustrated by steps 1010, 1012, 1014, 1016 and 1018 of method 1000. The channel information comprises at least a portion of the path description signed by the second secret which enables the client 160 to determine trustworthiness of the second channel. The portion of the path description signed by the second secret identifies a trustworthiness of the second channel to the client 160. The path description is verifiable by the client 160 based on the portion of the description signed by the second secret. Generally, step 1312 further comprises transmitting a protocol version usable in further communications on the second channel. The protocol version typically comprises a most recent protocol version compatible with the AS 102, client 160 and the authorized intermediary appliance.

As a next step 1314, encryption keys are shared and encrypted communications established compliant with a protocol version identified in the description of the second channel (i.e., the negotiated version set at step 926 of method 900) and the encryption algorithm version determined at step 1110 of method 1100. The AS 102 (i) shares encryption keys with the client 160, the DA 130 and the BA 140 over the second channel, (ii) a third channel is established, secured and trusted based on the encryption keys and (iii) media data is communicated via the third channel as unreliable datagrams between AS 102 and the client 160 using the same 4-tuple network addresses scheme as the second channel.

The method 1300 proceeds to 1320 where it ends.

Figure 14:
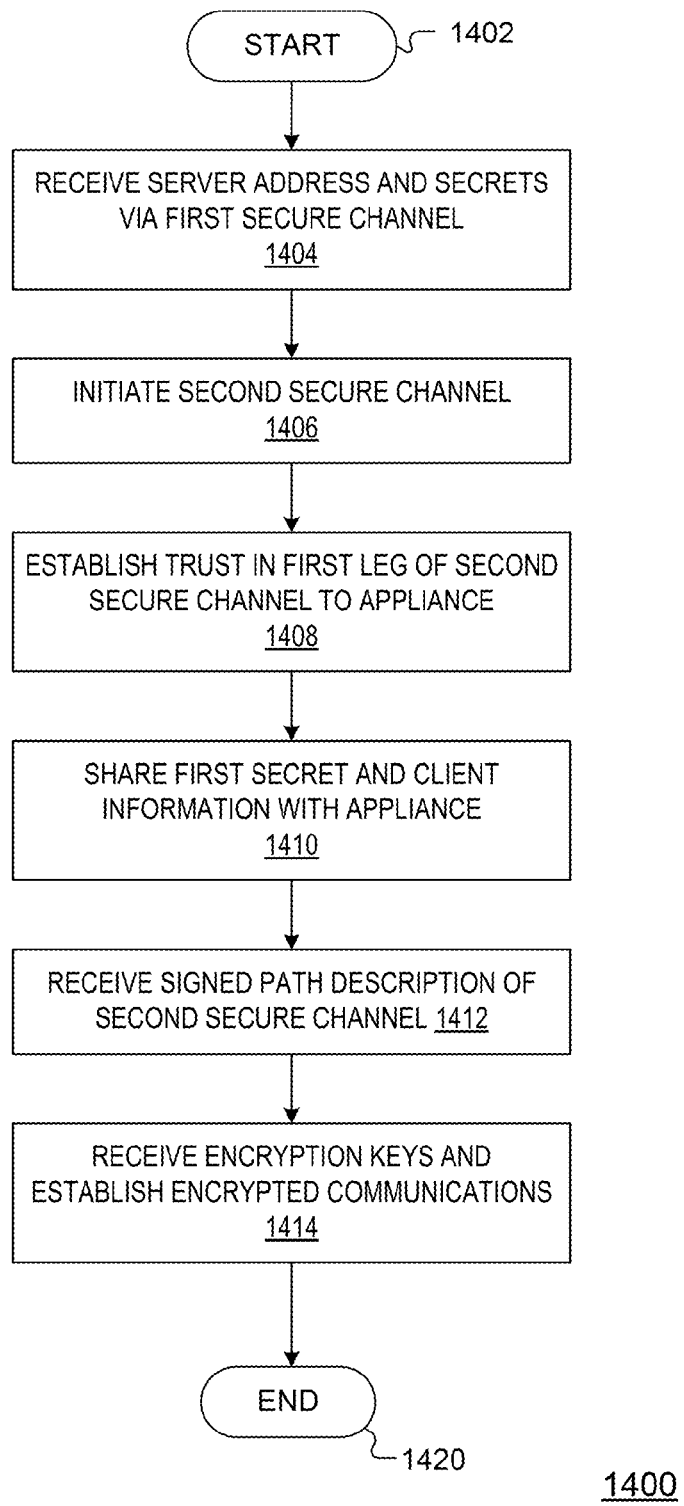
FIG. 14 is a flowchart illustrating a method, in accordance with one or more embodiments of the present invention, executed by a client, for establishing encrypted communications.

FIG. 14 is a flowchart illustrating a method 1400, in accordance with one or more embodiments of the present invention, executed by CCS 162 for establishing encrypted communications. Method 1400 starts at step 1402 and proceeds to step 1404 in which CCS 162 receives an address for AS 102 in addition to first and second secrets from AS 102 via a trusted computer CM 150 utilizing a first secure and trusted channel, for example as previously described for pre-session initiator phase 504 of method 500. The first secret is usable by an authorized intermediary appliance such as DA 130 to establish trust in AS 102 subsequent to AS 102 presenting the certificate to the authorized intermediary appliance that was originally used to generate the first secret.

As a next step 1406, CCS 162 initiates a second secure channel with AS 102, comprising transmitting a packet addressed with the address for AS 102, for example using an SSL client hello as described for step 824 of method 800. As a next step 1408, the CCS 162 establishes trust in a first leg of the second secure channel based on a verifiable certificate presented by an authorized intermediary appliance BA 140. In an embodiment previously described, server 804 presents a certificate at step 830 of method 800 and trust is established at step 834 based on the certificate validity. As a next step 1410, the CCS 162 shares the first secret and information of the client computer signed by the second secret, with the authorized intermediary appliance for example by sending APP_HELLO at step 836. The information of the client computer comprises data verifiable by AS 102 as originating from CCS 162 and in an embodiment, comprises the SHA-256 hash resultant concatenation of the SID, the thumbprint hash value and server address requested by the client. As a next step 1412, the CCS 162 establishes the trust of the second secure channel based on receiving, via the second secure channel, a path description of the second secure channel signed by the second secret which identifies the authorized intermediary appliance BA 140. As a next step 1414, CCS 162 receives encryption keys and establishes encrypted communications with AS 102, including BA 140 and DA 130. Method 1400 ends at step 1420.

Figure 15:
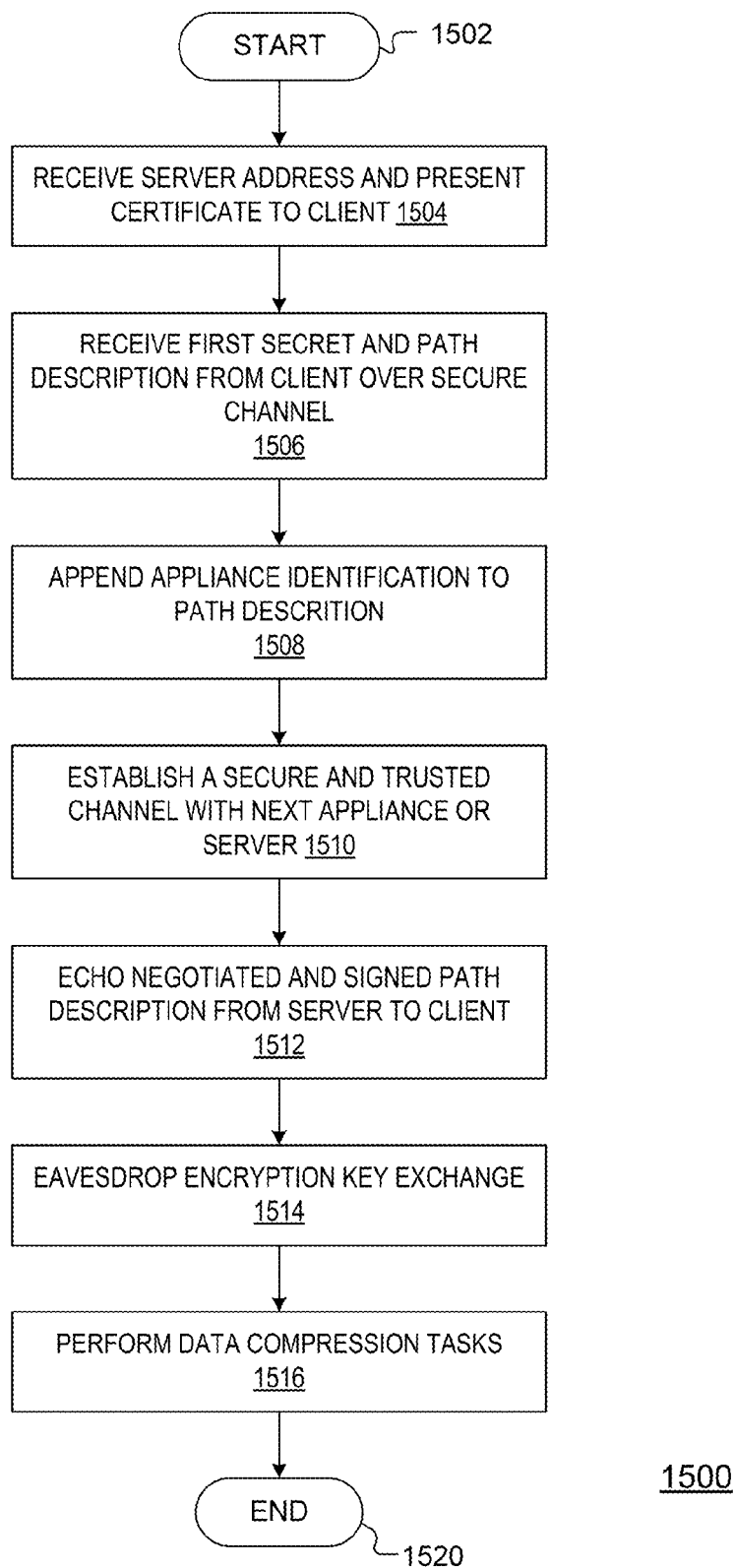
FIG. 15 is a flowchart illustrating a method, in accordance with one or more embodiments of the present invention, executed by an intermediary appliance such as a DA or a BA, for establishing encrypted communications.

FIG. 15 is a flowchart illustrating a method 1500, in accordance with one or more embodiments of the present invention, executed by an intermediary appliance such as DA 130 or a BA 140, for establishing encrypted communications. In some embodiments in which authorized intermediary appliances operate in tandem, only one of the appliances need partake in appending information to the path description, establishing trust with AS 102 and subsequent eavesdropping on the exchange of encryption keys. Thereafter, the participant appliance may utilize a private channel to forward encryption keys and version information to its tandem appliance(s).

Method 1500 starts at step 1502 and proceeds to step 1504 in which BA 140 obtains address information (such as server address) from a client 160 for identifying packets routed through BA 140 but addressed to AS 102. For example, BA 140 operating in capacity of server 804 receives an SSL client hello with SNI at step 826 in method 800. In response to receiving a request for a first secure BA channel from client 160 addressed to AS 102 (and identifiably by the address information), BA 140 presents a certificate verifying it as an authorized intermediary appliance, for example as shown at step 830 in method 800. As a next step 1506, BA 140 receives via the first secure BA channel, from client 160, (i) a first secret usable in authenticating AS 102 and (ii) a path description identifying the client 160. As a next step 1508, the BA 140 appends its own identification information to the path description. As a next step 1510, the BA 140 establishes a secure and trusted channel with the next authorized appliance in the direction of AS 102 (i.e., DA 130) or with AS 102 itself in different embodiments in order to transmit the appended path description to the server (i.e., BA 140 performs the role of client 802 in a repeated method 800). The trust of the second secure BA channel is based on using the first secret to validate a certificate presented by DA 130 or AS 102 in different embodiments. As a next step 1512, the negotiated and signed path description (i.e., payload) from AS 102 is echoed by BA 140 to client 160 using previously established first and second secure BA channels.

As a next step 1514, BA 140 eavesdrops the exchange of encryption keys. Thereafter, BA 140 establishes a private channel with DA 130 in the path between client 160 and AS 102. As a next step 1516, the DA 130 and BA 140 jointly perform data compression/decompression tasks, for example DA 130 decrypts media data received from AS 102, compresses the media data and communicates the compressed media data as encoded data to BA 140 over the established private channel. BA 140 decompresses and re-encrypts the encoded media data (i.e., regenerates the original data) prior to forwarding it on to client 160. In an embodiment, BA 140 establishes a third trusted BA channel with client 160 and a fourth trusted BA channel with AS 102 based on encryption keys exchanged, via the first secure BA channel and the second secure BA channel, between AS 102 and the client 160. The first and second secure BA channels use a reliable transport protocol whereas the third and fourth trusted BA channels use an unreliable datagram protocol. The method 1500 proceeds to step 1520 where it ends.

While the foregoing is directed to embodiments of the present invention, other and further embodiments of the invention may be devised without departing from the basic scope thereof, and the scope thereof is determined by the claims that follow.

The invention claimed is:

1. A method of establishing trusted inter-computer communications, comprising:
   initiating, by a server, an establishment of a first leg of a first trusted channel with a trusted computer based on a verifiable certificate of the trusted computer;
   initiating, by a client computer, an establishment of a second leg of the first trusted channel with the trusted computer based on the verifiable certificate;
   transmitting, by the server, to the client computer, via the first trusted channel, a first secret and a second secret generated from a self-signed certificate of the server;
   initiating, by the client computer, a first leg of a second trusted channel to the server, by addressing a packet with an Internet Protocol address of the server, wherein an Authorized Intermediary Appliance (AIM) identifies the packet as associated with the first leg of the second trusted channel and terminates the first leg of the second trusted channel, and wherein the AIM is authorized based on a second verifiable certificate of the AIM, the first secret shared with the AIM;
   establishing a trust, by the AIM, of a second leg of the second trusted channel based on the server presenting the self-signed certificate, verifiable by the first secret, to the AIM;
   establishing a trust, by the server, of the second trusted channel based on receiving the second secret via the second trusted channel, wherein establishing the trust by the server comprises verifying version information for the client computer against separately held session tags; and
   establishing a trust, by the client computer, of the second trusted channel based on receiving, from the server, a description of the second trusted channel, wherein the description comprises i) a path description of a path between the client computer and the server and ii) version information for the client computer signed by the second secret and iii) version information for the AIM.

2. The method of claim 1, wherein the first secret is shared between the server and the client computer inclusive of the AIM and the second secret is shared between the server and the client computer exclusive of the AIM.

3. The method of claim 1, wherein the AIM comprises a first computer and a second computer coupled by trusted communications, wherein a transmission path of the second trusted channel comprises communicating data from the server, via the first computer, the trusted communications and the second computer, to the client computer.

4. The method of claim 3 wherein the path description comprises version information for the first computer and the second computer.

5. The method of claim 4, wherein the path description is visible to the first computer and the second computer.

6. The method of claim 1, wherein the AIM trusts the server based on the self-signed certificate and the first secret.

7. The method of claim 1, further comprising (i) sharing, by the server, encryption keys with the client computer and the AIM over the second channel, (ii) establishing, by the server, a third channel secured and trusted based on the encryption keys and (iii) communicating, by the server, media data via the third channel as unreliable datagrams between the server and the client computer.

8. The method of claim 7 wherein the second channel and the third channel use 4-tuple network addressing.

9. The method of claim 7 wherein the second channel provides reliable data transport.

10. The method of claim 1, further comprising:
    establishing, by the server, a first leg of the first trusted channel based on the verifiable certificate of the trusted computer;
    establishing, by the client computer, a second leg of the first trusted channel based on the verifiable certificate of the trusted computer; and
    routing payloads, by the trusted computer, between the first leg and the second leg of the first trusted channel.

11. The method of claim 1, wherein (i) the first channel is established by the server addressing first communications to the trusted computer and the client computer addressing second communications to the trusted computer, and (ii) the second channel is established by the client computer addressing third communications to the server.

12. A system for establishing trusted inter-computer communications, comprising:
    a server that:
        transmits to a client computer, via a first leg of a first trusted channel, a first secret and a second secret generated from a self-signed certificate of the server; and
        establishes a trust of a second trusted channel based on receiving the second secret via the second trusted channel;
    the client computer that:
        initiates a second leg of a second trusted channel to the server by addressing a packet with an address of the server; and establishes a trust of the second trusted channel based on receiving, from the server, a description of the second trusted channel wherein the description comprises i) a path description of a path between the client computer and the server and ii) version information for the client computer signed by the second secret and iii) version information for an Authorized Intermediary Appliance (AIM); and the Authorized Intermediary Appliance (AIM) that:
identifies the packet as associated with the first leg of the second trusted channel and terminates the first leg of the second trusted channel, wherein the AIM is authorized based on a second verifiable certificate of the AIM, the first secret being shared with the AIM; and
establishes a trust of a second leg of the second trusted channel based on receiving the self-signed certificate, verifiable by the first secret, from the server.

13. The system of claim 12, wherein the first secret is shared between the server and the client computer inclusive of the AIM and the second secret is shared between the server and the client computer exclusive of the AIM.

14. The system of claim 12, wherein the AIM comprises a first computer and a second computer coupled by trusted communications, wherein a transmission path of the second trusted channel comprises communicating data from the server, via the first computer, the trusted communications and the second computer, to the client computer.

15. The system of claim 14 wherein the path description comprises version information for the first computer and the second computer.

16. The system of claim 15, wherein the path description is visible to the first computer and the second computer.

17. The system of claim 12, wherein the AIM trusts the server based on the self-signed certificate and the first secret.

18. The system of claim 12, wherein the server further shares encryption keys with the client computer and the AIM over the second channel, the server establishes a third channel secured and trusted based on the encryption keys and the server communicates media data via the third channel as unreliable datagrams between the server and the client computer.

19. The system of claim 18 wherein the second channel and the third channel use 4-tuple network addressing.

20. The system of claim 12 wherein the second channel provides reliable data transport.

* * * * *